US008104336B2

(12) United States Patent
Torigoe et al.

(10) Patent No.: US 8,104,336 B2
(45) Date of Patent: Jan. 31, 2012

(54) ACOUSTIC CAPACITY, VOLUME, AND SURFACE AREA MEASUREMENT METHOD

(75) Inventors: Ippei Torigoe, Kumamoto (JP); Takashi Segami, Tokyo (JP); Munehiro Date, Tokyo (JP)

(73) Assignees: Kukamoto University (JP); Rion Company Ltd. (JP); Munehiro Date (JP)

( * ) Notice: Subject to any disclaimer, the term of this patent is extended or adjusted under 35 U.S.C. 154(b) by 361 days.

(21) Appl. No.: 12/394,853

(22) Filed: Feb. 27, 2009

(65) Prior Publication Data

US 2009/0217749 A1    Sep. 3, 2009

(30) Foreign Application Priority Data

Feb. 29, 2008    (JP) ................................. 2008-048966

(51) Int. Cl.
*G01F 17/00*    (2006.01)
(52) U.S. Cl. ........................................................ 73/149
(58) Field of Classification Search ...................... 73/149
See application file for complete search history.

(56) References Cited

U.S. PATENT DOCUMENTS 5,824,892 A * 10/1998 Ishii ................................. 73/149
7,017,401 B2 * 3/2006 Ishii et al. ................... 73/114.77

FOREIGN PATENT DOCUMENTS

| JP | 10-300551 | | 11/1998 |
|----|-----------|---|---------|
| JP | 2002-131111 | | 5/2002 |
| JP | 2002131111 | A * | 5/2002 |
| JP | 2006-284473 | | 10/2006 |

OTHER PUBLICATIONS

Torigoe et al., "Surface Area Measurement Utilizing Sound," Collected Papers of the Society of Instrument and Control Engineers, vol. 34, No. 3, 182-187, 1998 (Abstract only).

* cited by examiner

*Primary Examiner* — Lisa Caputo
*Assistant Examiner* — Jamel Williams
(74) *Attorney, Agent, or Firm* — Sheridan Ross P.C.

(57) ABSTRACT

An acoustic capacity measurement method for finding capacity of a container or object by removing effect of the surface area without using an approximate expression of acoustic impedance is provided. The acoustic capacity measurement method for finding capacity of a container includes a pressure change ratio calculating step, a rotation step, an oblique coordinate transformation step, and a capacity calculating step.

5 Claims, 6 Drawing Sheets

OBLIQUE COORDINATE SYSTEM
USED TO SEPARATE CAPACITY AND SURFACE AREA

ACOUSTIC CAPACITY, VOLUME, AND SURFACE AREA MEASUREMENT METHOD

BACKGROUND OF THE INVENTION

1. Field of the Invention

The present invention relates to an acoustic capacity, volume, and surface area measurement method which measures capacity, volume, and surface areas of complex-shaped containers or other objects using an acoustic technique.

2. Description of the Related Art

Conventionally known acoustic capacity measurement methods include one which involves giving alternating capacity changes to a reference vessel and a measuring vessel, measuring pressure changes in the vessels, finding acoustic impedance based on a ratio between the pressure changes, and thereby calculating capacity of the measuring vessel (see, for example, patent documents 1 and 2, the entire contents of which are hereby incorporated herein by reference).

Also known is an acoustic surface area measurement method which similarly measures a surface area of an object based on a phase difference of acoustic impedance (see, for example, patent document 3, the entire contents of which are hereby incorporated herein by reference).

According to this method, acoustic impedance Z in a closed space is given by Equations (1) to (3) below.

[Formula 1]

$$Z = (\gamma P_0 / j\omega V) \times (1 - \epsilon(1-j)) \quad (1)$$

$$\epsilon = (\gamma - 1)\delta_t S / 2V \quad (2)$$

$$\delta_t = (2\kappa / \rho \omega C_P)^{1/2} \quad (3)$$

where $P_0$ is static pressure in the closed space (atmospheric pressure), $\gamma$ is a specific heat ratio of gas (approximately 1.4 in the case of air), V is capacity of the closed space, S is a total surface area in the closed space, $\omega$ is an angular frequency of capacity changes (sound), $\kappa$ is heat conductivity of air, $\rho$ is density of air, $C_P$ is specific heat at constant pressure, $\delta_t$ is thickness of a thermal boundary layer, and j is the imaginary unit. It can be seen from Equation (2) that $\epsilon$ which represents effect of $\delta_t$ (thermal boundary layer) on acoustic impedance is proportional to the surface area S.

Also, as can be seen from Equation (1), the acoustic impedance Z varies linearly in the complex plane with changes in the surface area S when the capacity V is constant, and a measurement method is known which removes the effect of the surface area using this relationship (see, for example, patent document 2).

[Patent document 1] Japanese Patent Laid-Open No. 2002-131111

[Patent document 2] Japanese Patent Laid-Open No. 2006-284473

[Patent document 3] Japanese Patent Laid-Open No. 10-300551

However, Equation (1) is an approximate expression in which higher-order terms of the reciprocal of acoustic admittance are omitted by assuming in the process of derivation of Equation (1) that $\epsilon$ is sufficiently smaller than 1. (See "Surface Area Measurement Utilizing Sound," Torigoe & Ishii, Collected Papers of the Society of Instrument and Control Engineers, Vol. 34, No. 3, 182-187, 1998)

That is, capacity and volume are measured with the effect of the surface area removed by assuming that in the complex plane which represents acoustic impedance, the acoustic impedance varies approximately linearly with changes in the surface area. When no approximation is used, Equation (1) is replaced by Equation (4) below.

[Formula 2]

$$Z = (\gamma P_0 / j\omega V) / (1 + \epsilon(1-j)) \quad (4)$$

According to Equation (4), in the complex plane which represents the acoustic impedance Z, the acoustic impedance does not vary linearly with changes in the surface area when the volume is constant. If the effect of the surface area is removed by assuming a linear variation, errors can occur in measurement results.

SUMMARY OF THE INVENTION

An object of the present invention, which has been made in view of the above problem with conventional techniques, is to provide an acoustic capacity, volume, and surface area measurement method for finding capacity, volume, and a surface area of a container or object by removing effect of the surface area without using an approximate expression of acoustic impedance.

To solve the above problem, according to claim 1 of the present invention, there is provided an acoustic capacity measurement method for finding capacity of a container under test based on a ratio of pressure changes produced in a reference vessel and the container under test by giving equal alternating capacity changes to the reference vessel and the container under test, the acoustic capacity measurement method comprising: a pressure change ratio calculating step of calculating a ratio between measured values of pressure changes in the reference vessel and the container under test; a rotation step of calculating an acoustic admittance component of the container under test by rotating the pressure change ratio calculated in the pressure change ratio calculating step by an angle of θ so that the pressure change ratio will vary at a slope of 1 with respect to changes in a surface area in a complex plane; an oblique coordinate transformation step of transforming the acoustic admittance component calculated in the rotation step into an oblique coordinate system whose axes are given by an imaginary axis and a straight line with a slope of 1; and a capacity calculating step of calculating the capacity of the container under test by multiplying values in a direction of the imaginary axis of the acoustic admittance component transformed into oblique coordinates in the oblique coordinate transformation step by a predetermined real number.

According to claim 2 of the present invention, in the acoustic capacity measurement method set forth in claim 1, the angle θ used in the rotation step and the predetermined real number used in the capacity calculating step are determined before capacity measurement using a container whose capacity and surface area are known.

According to claim 3 of the present invention, there is provided an acoustic volume measurement method for finding volume of a body under test based on a ratio of pressure changes in a reference vessel and a container which contains the body under test and has a known capacity, where the pressure changes are produced by giving equal alternating capacity changes to the reference vessel and the container containing the body under test, the acoustic volume measurement method comprising: a pressure change ratio calculating step of calculating a ratio between measured values of pressure changes in the reference vessel and the container containing the body under test; a rotation step of calculating an acoustic admittance component of the container containing the body under test by rotating the pressure change ratio calculated in the pressure change ratio calculating step by an angle of θ so that the pressure change ratio will vary at a slope of 1 with respect to changes in a surface area in a complex plane; an oblique coordinate transformation step of transforming the acoustic admittance component calculated in the rotation step into an oblique coordinate system whose axes are given by an imaginary axis and a straight line with a slope of 1; and a capacity calculating step of calculating the capacity of the container containing the body under test by multiplying values in a direction of the imaginary axis of the acoustic admittance component transformed into oblique coordinates in the oblique coordinate transformation step by a predetermined real number, wherein the volume of the body under test is found based on the capacity of the container containing the body under test and the known capacity of the container.

According to claim 4 of the present invention, in the acoustic volume measurement method set forth in claim 3, the angle θ used in the rotation step and the predetermined real number used in the capacity calculating step are determined before volume measurement using a container whose capacity and surface area are known.

According to claim 5 of the present invention, there is provided an acoustic surface area measurement method for finding a surface area of an object under test based on a ratio of pressure changes produced in a reference vessel and the object under test by giving equal alternating capacity changes to the reference vessel and the object under test, the acoustic surface area measurement method comprising: a pressure change ratio calculating step of calculating a ratio between measured values of pressure changes in the reference vessel and the object under test; a rotation step of calculating an acoustic admittance component of the object under test by rotating the pressure change ratio calculated in the pressure change ratio calculating step by an angle of θ so that the pressure change ratio will vary at a slope of 1 with respect to changes in a surface area in a complex plane; and a surface area calculating step of calculating the surface area of the object under test by multiplying a real part of the acoustic admittance component found in the rotation step by a predetermined real number.

The invention as set forth in claims 1 and 2 uses acoustic admittance instead of an approximate expression of acoustic impedance. Since the invention does not use approximation when calculating capacity from measured pressure changes, it is possible to improve capacity measurement accuracy.

The invention as set forth in claims 3 and 4 uses acoustic admittance instead of an approximate expression of acoustic impedance. Since the invention does not use approximation when calculating volume from measured pressure changes, it is possible to improve volume measurement accuracy.

The invention as set forth in claim 5 uses acoustic admittance instead of an approximate expression of acoustic impedance. Since the invention does not use approximation when calculating a surface area from measured pressure changes, it is possible to improve surface area measurement accuracy.

DETAILED DESCRIPTION OF THE PREFERRED EMBODIMENT

Figure 1:
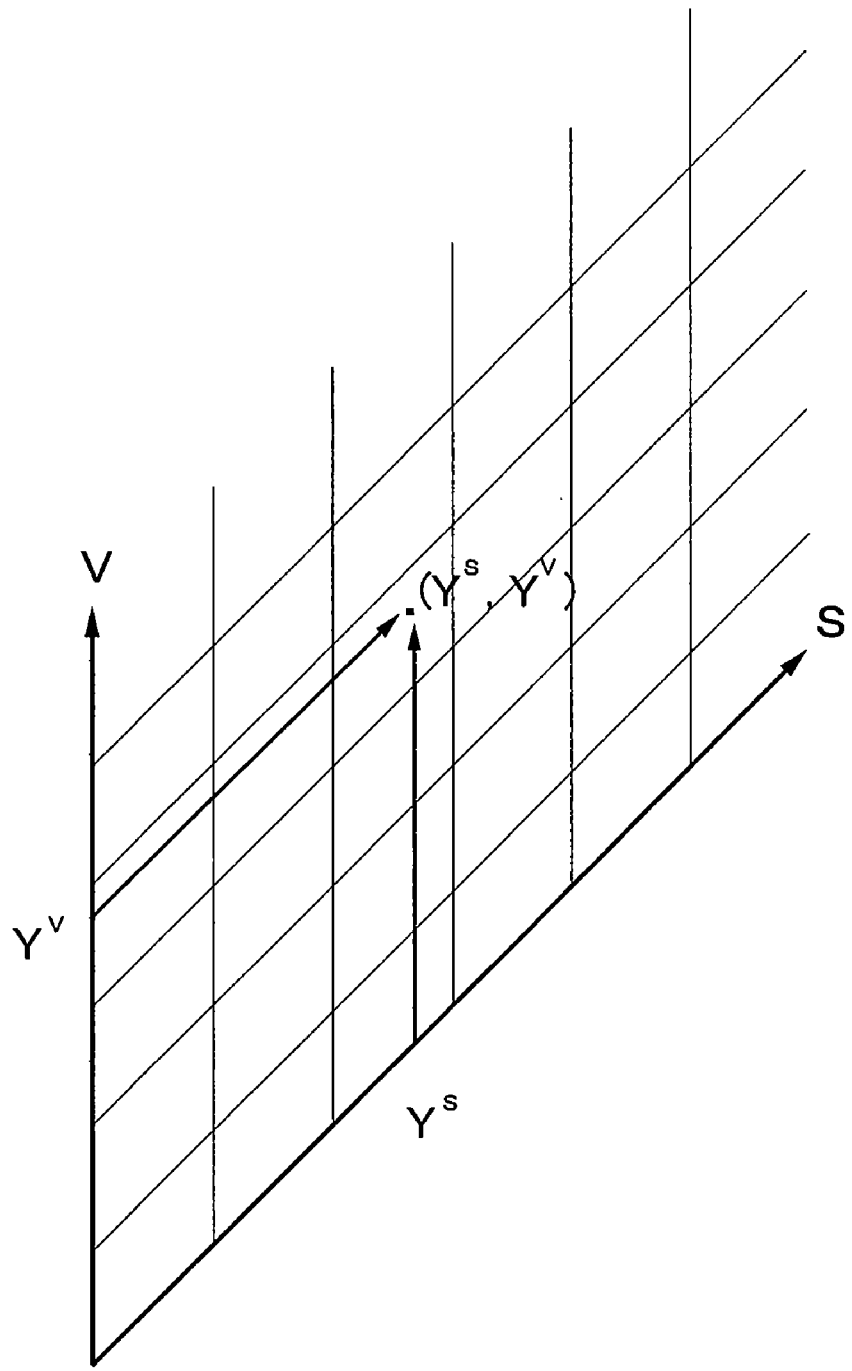
FIG. 1 is a diagram showing an oblique coordinate system used to separate capacity and surface area.
Figure 2:
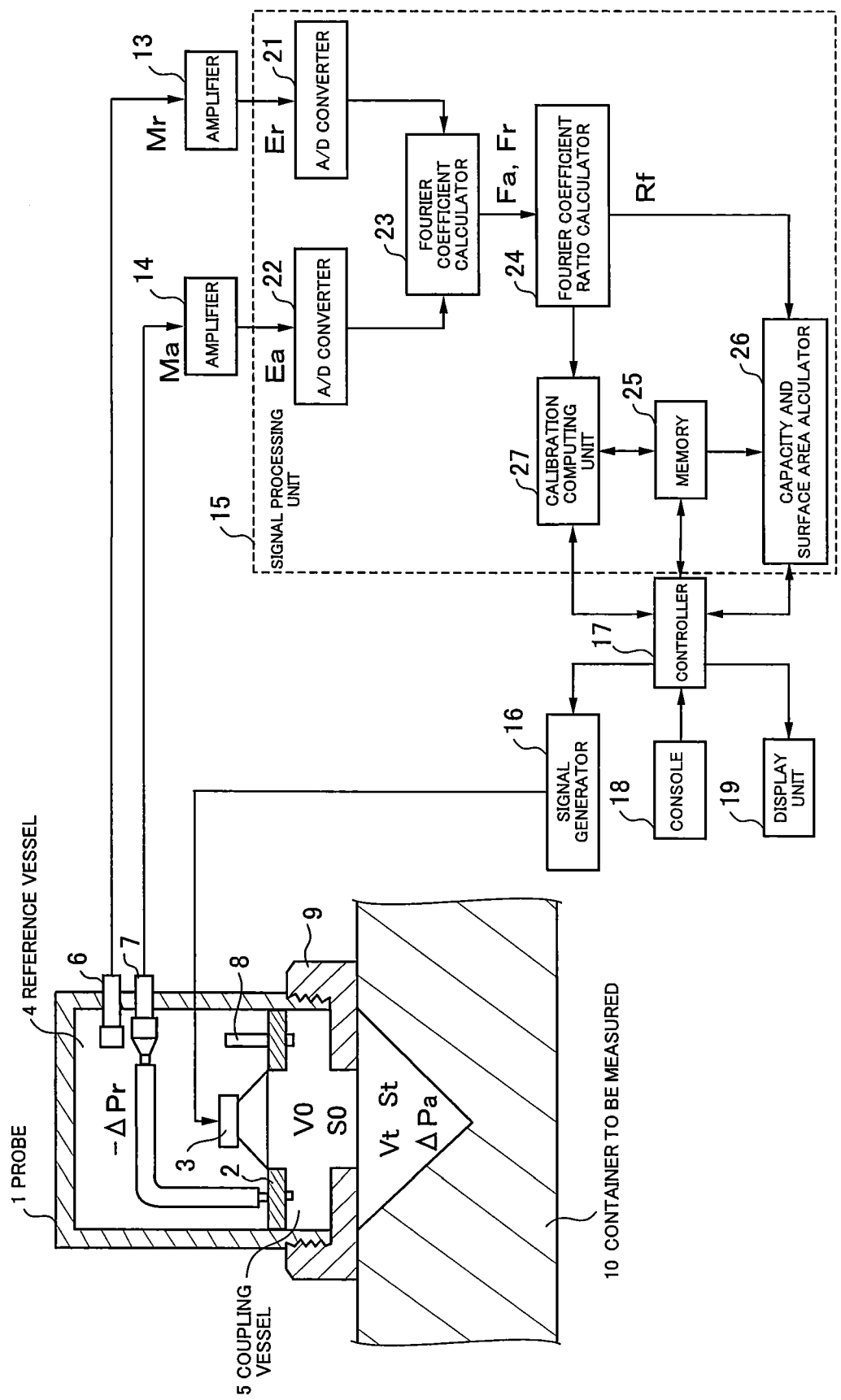
FIG. 2 is a block diagram of an acoustic capacity and surface area measurement apparatus resulting from application of a capacity and surface area measurement method according to the present invention.
Figure 3:
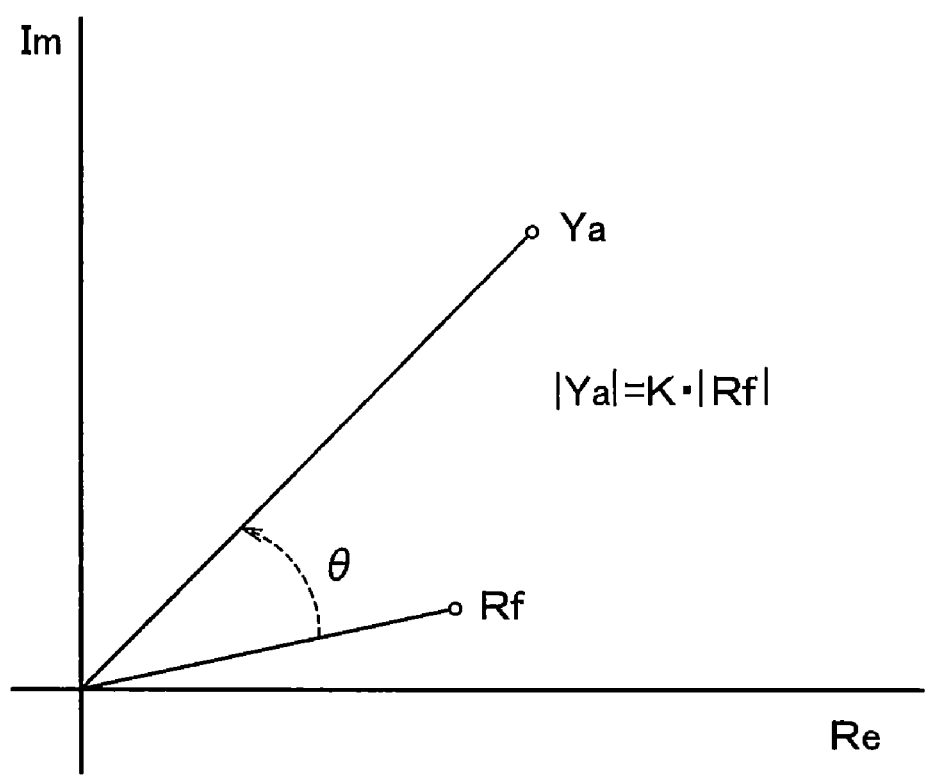
FIG. 3 is a diagram showing a pressure ratio and admittance in a complex plane.
Figure 4:
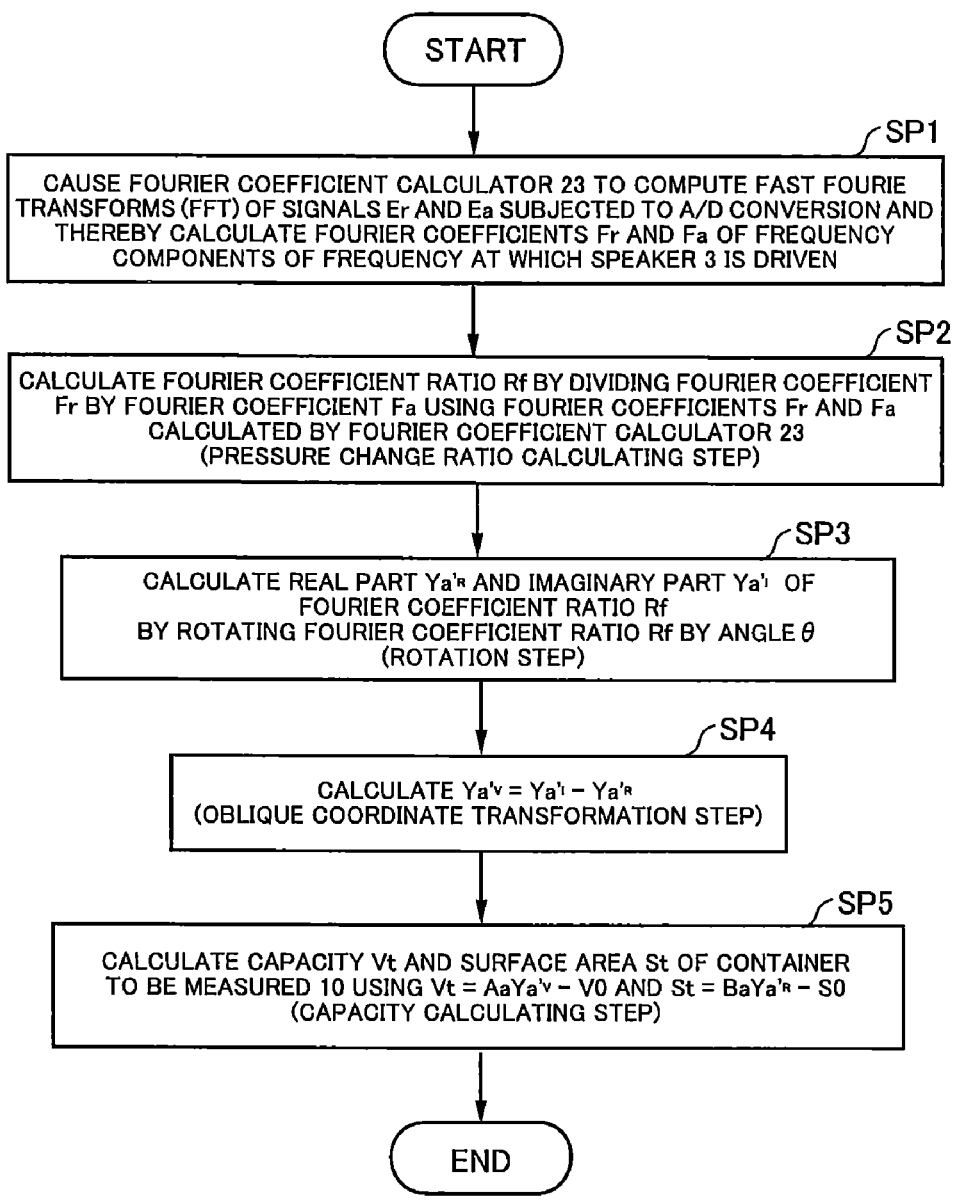
FIG. 4 is a flowchart of the capacity and surface area measurement method according to the present invention.
Figure 5:
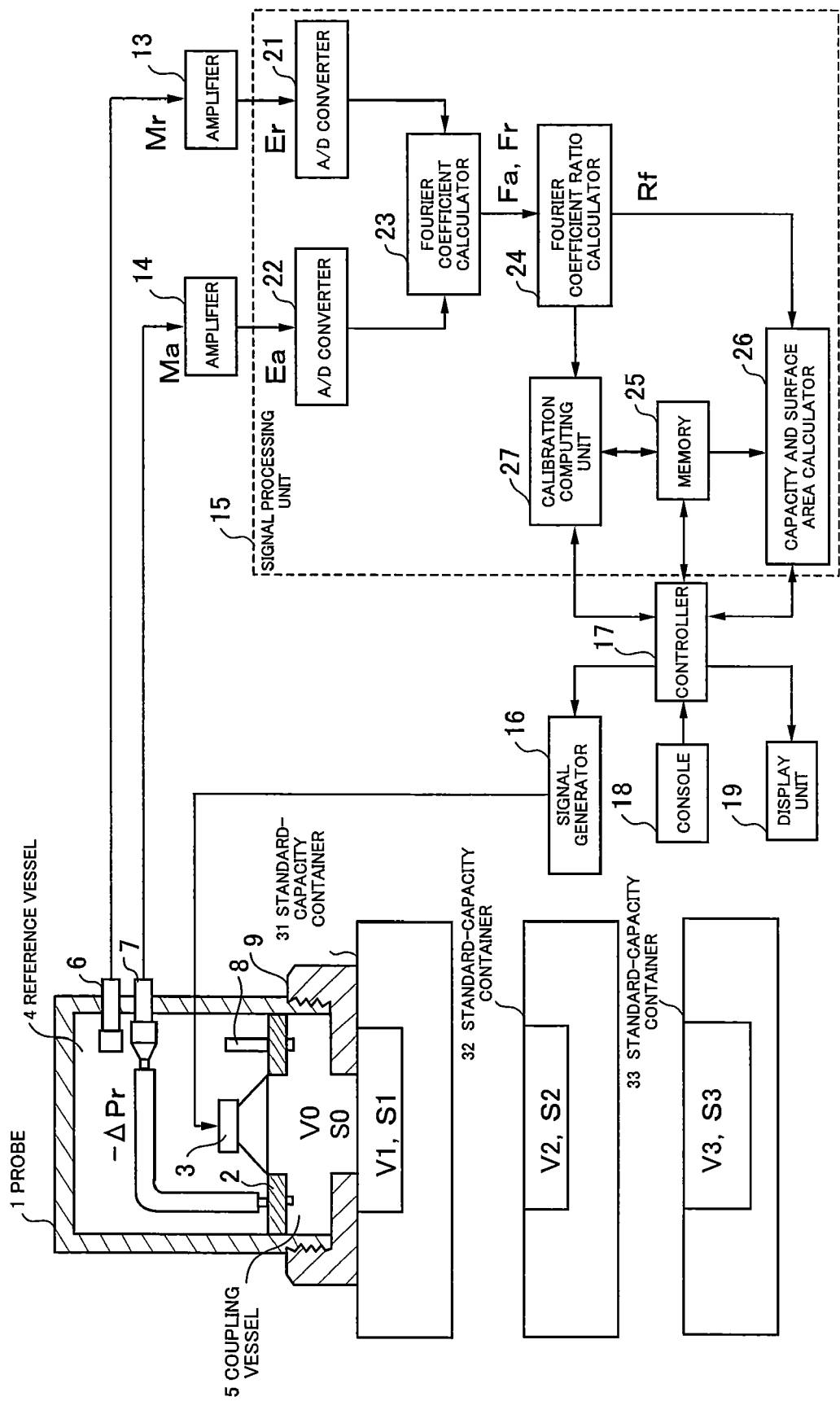
FIG. 5 is an explanatory diagram illustrating calibration of the acoustic capacity and surface area measurement apparatus.
Figure 6:
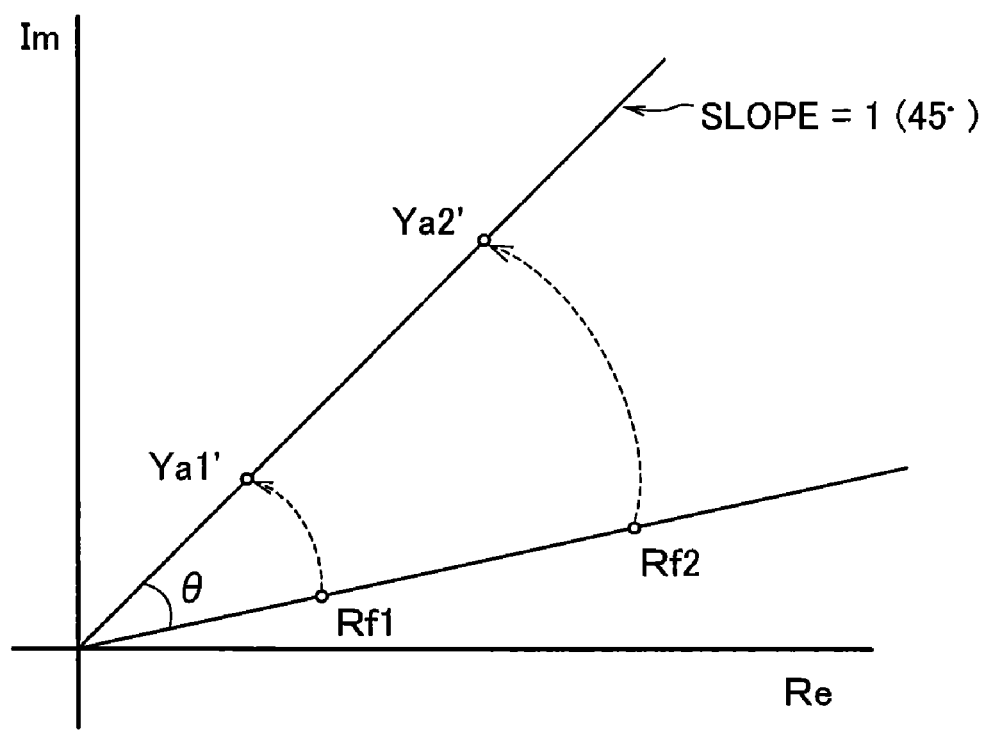
FIG. 6 is a diagram showing a pressure ratio and admittance in the complex plane during calibration.

An embodiment of the present invention will now be described below with reference to the accompanying drawings. FIG. 1 is a diagram showing an oblique coordinate system used to separate capacity and surface area, FIG. 2 is a block diagram of an acoustic capacity and surface area measurement apparatus resulting from application of a capacity and surface area measurement method according to the present invention, FIG. 3 is a diagram showing a pressure ratio and admittance in a complex plane, FIG. 4 is a flowchart of the capacity and surface area measurement method according to the present invention, FIG. 5 is an explanatory diagram illustrating calibration of the acoustic capacity and surface area measurement apparatus, and FIG. 6 is a diagram showing a pressure ratio and admittance in the complex plane during calibration.

First, description will be given of principles of a capacity and surface area measurement method which uses acoustic admittance. Acoustic admittance Y in a closed space is given by Equation (5) below (Torigoe & Ishii, "Surface Area Measurement Using Sound," Collected Papers of the Society of Instrument and Control Engineers, Vol. 34, No. 3).

[Formula 3]

$$Y = \frac{j\omega V}{\gamma P_0}(1 + \varepsilon(1-j)) \tag{5}$$

where $P_0$ is static pressure in the closed space (atmospheric pressure), $\gamma$ is a specific heat ratio of gas (approximately 1.4 in the case of air), V is capacity of the closed space, S is a total surface area in the closed space, $\omega$ is an angular frequency of capacity changes (sound), $\kappa$ is heat conductivity of air, $\rho$ is density of air, $C_P$ is specific heat at constant pressure, $\delta_t$ is thickness of a thermal boundary layer, and j is the imaginary unit, as in the case of Equations (1) to (3). In Equations (5) and (2), if $A=\omega/(\gamma P_0)$ and $B=(\gamma-1)*\delta_t/2$, the acoustic admittance Y is given by Equation (6) below.

[Formula 4]

$$Y=A(BS+j(BS+V)) \tag{6}$$

In a complex plane, according to Equation (6), when the capacity V of the closed space changes while the surface area S is kept constant, the admittance varies in parallel and in proportion to an imaginary axis. On the other hand, when the surface area S changes while the capacity V of the closed space is kept constant, the admittance varies along a straight line with a slope of 1. Thus, contravariant components ($Y^S$, $Y^V$) of the admittance in an oblique coordinate system defined by a straight line (S axis) passing through the origin and having a slope of 1 and by an imaginary axis (V axis) are proportional only to the surface area and capacity, respectively. Specifically, if the acoustic admittance Y is $Y^R+jY^I$, since the contravariant components are $Y^S=Y^R$ and $Y^V=Y^I-Y^R$, the capacity V and surface area S are given by Equations (7) and (8), respectively.

[Formula 5]

$$V = \alpha Y^V = \alpha(Y^I - Y^R) \quad (7)$$

$$S = \beta Y^S = \beta Y^R \quad (8)$$

Therefore, if the proportionality constant α or β is available, the capacity V or surface area S of a container can be found from Equation (7) or (8) by measuring the acoustic admittance Y of the container whose capacity is unknown. The proportionality constants α and β are found using a plurality of standard containers whose capacities and surface areas are known. Details will be described later.

Generally, it is known that acoustic admittance=rate of capacity change/pressure change.

Given a reference vessel r whose capacity and surface area are known and a container a whose capacity and surface area are unknown, if Yr denotes acoustic admittance of the reference vessel r, Pr denotes pressure changes of the reference vessel r, Ya denotes acoustic admittance of the container a, and Pa denotes pressure changes of the container a, when time-varying capacity changes are given equally to the reference vessel r and container a, a relationship between an acoustic admittance ratio and pressure change ratio (Pr/Pa) is given by Equation (9) below.

[Formula 6]

$$Ya/Yr = Pr/Pa \quad (9)$$

Thus, the acoustic admittance Ya can be found by eliminating the acoustic admittance Yr from the pressure change ratio (Pr/Pa). To eliminate the acoustic admittance Yr, the pressure change ratio (Pr/Pa) plotted in the complex plane can be rotated by a predetermined phase angle θ and multiplied by a real number K so as to fit in the oblique coordinate system in FIG. 1 (see FIG. 3, where Rf=Pr/Pa). The phase angle θ, real number K, and proportionality constants α and β can be determined from Equations (7) and (8) using at least two standard-capacity containers whose capacities and surface areas are known.

Next, description will be given of an acoustic capacity and surface area measurement apparatus resulting from application of the capacity and surface area measurement method according to the present invention. As shown in FIG. 2, a speaker 3 is placed on a bulkhead 2 formed in a probe 1. The probe 1 is partitioned into a reference vessel 4 (with a capacity Vr) and coupling vessel 5. Sound pressure changes in the reference vessel 4 and coupling vessel 5 are detected by microphones 6 and 7. A communicating tube 8 is installed in the bulkhead 2 to balance static pressure (atmospheric pressure) and equalize gas components between the reference vessel 4 and coupling vessel 5. The coupling vessel 5 is connected with a container to be measured 10 (with a capacity Vt and surface area St), via an adapter 9. The coupling vessel 5 and adapter 9 form a space with a capacity V0 and surface area S0.

The capacity Vt and surface area St of the container to be measured 10 can be found by measuring a total capacity Va (=V0+Vt) and total surface area Sa (=S0+St) of the container to be measured 10, coupling vessel 5, and adapter 9. The subscript r represents the reference vessel 4 and subscript a represents the container under test. The capacity V0 and surface area S0 exist even when no adapter is used such as when the speaker 3 is cone-shaped.

The container to be measured 10 is connected to the coupling vessel 5 in such a way that there will be no air leakage from mating faces of the container to be measured 10 and coupling vessel 5. Thus, values of the capacity V0 and surface area S0 vary with the connection method and the shape of the adapter 9. Alternatively, the coupling vessel 5 and container to be measured 10 may be connected directly with a lubricant such as grease applied to the mating faces and without using the adapter 9.

The speaker 3 gives alternating, time-varying, minute capacity changes equally but differentially to the reference vessel 4 and a space formed by a combination of the coupling vessel 5 and container to be measured 10. The microphones 6 and 7 detect sound pressure changes in the reference vessel 4 and the combination of the coupling vessel 5, container to be measured 10, and adapter 9.

The acoustic capacity and surface area measurement apparatus includes amplifiers 13 and 14 which amplify output signals Mr and Ma of the microphones 6 and 7, a signal processing unit 15 which processes output signals Er and Ea of the amplifiers 13 and 14 after A/D (analog/digital) conversion, a signal generator 16 which provides a capacity-changing signal (e.g., sine wave signal) to the speaker 3 controlled by the signal processing unit 15, a controller 17 which controls the signal processing unit 15 and signal generator 16, a console 18, and a display unit 19. Incidentally, a personal computer may be used as the signal processing unit 15, signal generator 16, controller 17, console 18, and display unit 19.

The signal processing unit 15 includes A/D converters 21 and 22 which perform A/D conversion of the output signals Er and Ea of the amplifiers 13 and 14, a Fourier coefficient calculator 23 which computes Fourier transforms of the output signals Er and Ea of the amplifiers 13 and 14 after A/D conversion and thereby calculates Fourier coefficients (complex quantities) Fr and Fa of frequency components of a frequency (e.g., 30 Hz) at which the speaker 3 is driven, a Fourier coefficient ratio calculator 24 which calculates a Fourier coefficient ratio (complex quantity) Rf by dividing the Fourier coefficient Fr by the Fourier coefficient Fa, memory 25 which stores data and arithmetic parameters, a capacity and surface area calculator 26 which calculates a capacity and surface area using the Fourier coefficient ratio Rf and arithmetic parameters, and a calibration computing unit 27 which calculates the arithmetic parameters for calibration.

Next, a method for calculating the capacity Va and surface area Sa in the signal processing unit 15 will be described. To measure the capacity Va and surface area Sa using the microphones 6 and 7, it is necessary to take a gain ratio and phase difference of an electric circuit into consideration. If Pr and Pa denote pressure changes of the reference vessel 4 and container under test resulting from capacity changes caused by the speaker 3, the acoustic admittances Yr and Ya of the reference vessel 4 and container under test are given by Equation (9).

However, numeric values obtained by measurement—i.e., measurements of pressure changes Pr and Pa—are Fourier coefficients Fr and Fa, and contain the gain ratio G and phase difference θc of the electric circuit. Consequently, Equation (9) becomes $Ya/Yr = Rf \cdot Ge^{j\theta_c}$.

Thus, to obtain the acoustic admittance Ya of the container under test by eliminating the acoustic admittance Yr of the reference vessel 4 and effect ($Ge^{j\theta_c}$) of the electric circuit from the Fourier coefficient ratio Rf obtained using measured values, the Fourier coefficient ratio Rf is rotated by an angle of θ in the complex plane and multiplied by K, as shown in FIG. 3 and Equation (10).

[Formula 7]

$$Ya = Rf \cdot K e^{j\theta} \quad (10)$$

Then, the real part and imaginary part of Equation (10) are substituted into Equations (7) and (8) to find the capacity Va and surface area Sa of the container under test.

Five arithmetic parameters are used to find the capacity Vt and surface area St of the container to be measured 10: α·K (=Aa), β·K (=Ba), V0, S0, and θ. Use of three containers (standard-capacity containers) of a known capacity and surface area provides six parameters in total, making it possible to calculate the arithmetic parameters. The process of finding the five arithmetic parameters Aa, Ba, V0, S0, and θ is called calibration, which will be described later.

After the five arithmetic parameters Aa, Ba, V0, S0, and θ are obtained by calibration, the capacity Vt and surface area St of the container to be measured 10 can be calculated using procedures (steps) shown in FIG. 4. First, in Step SP1, the Fourier coefficient calculator 23 computes fast Fourier transforms (FFT) of the signals Er and Ea subjected to A/D conversion by the A/D converters 21 and 22 and thereby calculates the Fourier coefficients (complex quantities) Fr and Fa of frequency components of the frequency (e.g., 30 Hz sine wave) at which the speaker 3 is driven.

Next, in Step SP2, using the Fourier coefficients Fr and Fa calculated by the Fourier coefficient calculator 23, a Fourier coefficient ratio (complex quantity) $Rf(=Af \cdot e^{j\theta_f})$ is calculated by dividing the Fourier coefficient Fr by the Fourier coefficient Fa (pressure change ratio calculating step).

Next, in Step SP3, the acoustic admittance Yr of the reference vessel 4 and effect ($Ge^{j\theta_c}$) of the electric circuit is eliminated from the Fourier coefficient ratio Rf. Specifically, the real part $Ya'^R=(Ya^R/K)$ and imaginary part $Ya'^I=(Ya^I/K)$ of the Fourier coefficient ratio Rf are calculated by rotating the Fourier coefficient ratio Rf plotted in the complex plane by an angle θ (rotation step). Next, in Step SP4, $Ya'^V=Ya'^I-Ya'^R$ is calculated (oblique coordinate transformation step). In Step SP5, the capacity Vt and surface area St of the container to be measured 10 are calculated using Equations (11) and (12) (capacity calculating step).

[Formula 8]

$$Vt = Aa Ya'^V - V0 \quad (11)$$

$$St = Ba Ya'^R - S0 \quad (12)$$

Next, operation of the acoustic capacity and surface area measurement apparatus will be described, assuming that values of the five arithmetic parameters Aa, Ba, V0, S0, and θ have been determined by calibration. First, the container to be measured 10 and probe 1 are connected via the adapter 9. The container to be measured 10 and coupling vessel 5 are connected in such a way as to eliminate air leakage. When a start measurement command is given to the controller 17 via the console 18, the controller 17 gives a generate signal command to the signal generator 16. Upon receiving the generate signal command, the signal generator 16 drives the speaker 3 (e.g., 30 Hz sine wave).

According to the present embodiment, the speaker 3 serving as capacity changing means is installed on the bulkhead 2 which partitions the reference vessel 4 and container under test, but separate speakers may be installed in the reference vessel 4 and coupling vessel 5 to give equal capacity changes. Sound pressure changes in the reference vessel 4 and object under test caused by the speaker 3 are picked up by the microphones 6 and 7. The output signals Mr and Ma are amplified by the respective amplifiers 13 and 14 and outputted as the signals Er and Ea to the signal processing unit 15.

The signal processing unit 15 performs arithmetic processing as follows. First, the A/D converters 21 and 22 perform A/D conversion of the signals Er and Ea. Then, the Fourier coefficient calculator 23 computes fast Fourier transforms (FFT) of the signals Er and Ea subjected to the A/D conversion and thereby calculates the Fourier coefficients (complex quantities) Fr and Fa of frequency components of the frequency (e.g., 30 Hz sine wave) at which the speaker 3 is driven.

Next, the Fourier coefficient ratio calculator 24 calculates the Fourier coefficient ratio (complex quantity) Rf by dividing the Fourier coefficient Fr by the Fourier coefficient Fa, and then the capacity and surface area calculator 26 reads the five arithmetic parameters Aa, Ba, V0, S0, and θ out of the memory 25 and calculates the capacity Vt and surface area St of the container to be measured 10 using the procedures described above. The calculated capacity Vt and surface area St are displayed in the display unit 19. Next, when a measurement end operation and data save operation are specified via the console 18, an instruction for each operation are given to the controller 17, which then ends the measurement operation and saves measured data in the memory 25.

Next, calibration of the acoustic capacity and surface area measurement apparatus will be described with reference to FIG. 5. As shown in FIG. 5, three standard-capacity containers are prepared: a standard-capacity container 31 with a capacity V1 and surface area S1, standard-capacity container 32 with a capacity V2 and surface area S2, and standard-capacity container 33 with a capacity V3 and surface area S3. Fourier coefficient ratios Rf1, Rf2, and Rf3 obtained by measuring the standard-capacity containers 31, 32, and 33 are plotted in a complex plane.

As described above, the acoustic admittance Ya of the container under test is obtained when the Fourier coefficient ratio Rf obtained from actual measurements is rotated by an angle of θ in the complex plane and multiplied by K. Also, the acoustic admittance Ya fits in the oblique coordinate system in FIG. 1. Based on these principles, the calibration computing unit 27 performs the following calculations.

First, Rf1, Rf2, and Rf3 are plotted in the complex plane. If Ya1', Ya2', and Ya3' denote coordinates obtained by rotating Rf1, Rf2, and Rf3, what is necessary is to calculate the arithmetic parameters Aa, Ba, V0, S0, and θ which equalize a ratio of S-axis coordinate values or V-axis coordinate values of the coordinates Ya1', Ya2', and Ya3' in the oblique coordinate system in FIG. 1 with a ratio of the capacities or surface areas of the containers under test.

Incidentally, as shown in FIG. 6, if the standard-capacity container 31 and standard-capacity container 32 have equal capacity, the angle θ can be found easily by rotating the standard-capacity containers 31 and 32 in such a way that the acoustic admittance will fit on a straight line with a slope of 1 in the oblique coordinate system.

To find volume of a body under test, if the body under test is put in a container of known capacity and capacity of a space in the container is measured in the same manner as described above, the volume of the body under test can be derived easily from the difference between the known capacity and the capacity of the space. Calibration for volume measurement can be performed in the same manner as described above using a standard object of known volume. The surface area of an object under test can be measured in a similar manner.

The present invention uses acoustic admittance instead of an approximate expression of acoustic impedance. Since the present invention does not use approximation when calculating a capacity, volume, and surface area from measured pressure changes, the present invention provides a measurement method with improved accuracy of capacity, volume, and surface area measurement.

What is claimed is:

1. An acoustic capacity measurement method for finding capacity of a container under test based on a ratio of pressure changes produced in a reference vessel and the container under test by giving equal alternating capacity changes to the reference vessel and the container under test, the acoustic capacity measurement method comprising:

receiving, at a signal processing unit, measured values of pressure changes in the reference vessel and the container under test;

a pressure change ratio calculating step of calculating, by the signal processing unit, a ratio between the measured values of pressure changes in the reference vessel and the container under test;

a rotation step of calculating, by the signal processing unit, an acoustic admittance component of the container under test by rotating the pressure change ratio calculated in the pressure change ratio calculating step by an angle of $\theta$ so that the pressure change ratio will vary at a slope of 1 with respect to changes in a surface area in a complex plane;

an oblique coordinate transformation step of transforming, by the signal processing unit, the acoustic admittance component calculated in the rotation step into an oblique coordinate system whose axes are given by an imaginary axis and a straight line with a slope of 1; and a capacity calculating step of calculating, by the signal processing unit, the capacity of the container under test by multiplying values in a direction of the imaginary axis of the acoustic admittance component transformed into oblique coordinates in the oblique coordinate transformation step by a predetermined real number.

2. The acoustic capacity measurement method according to claim 1, wherein the angle $\theta$ used in the rotation step and the predetermined real number used in the capacity calculating step are determined before capacity measurement using a container whose capacity and surface area are known.

3. An acoustic volume measurement method for finding volume of a body under test based on a ratio of pressure changes in a reference vessel and a container which contains the body under test and has a known capacity, where the pressure changes are produced by giving equal alternating capacity changes to the reference vessel and the container containing the body under test, the acoustic volume measurement method comprising:

receiving, at a signal processing unit, measured values of pressure changes in the reference vessel and the container under test;

a pressure change ratio calculating step of calculating a ratio between the measured values of pressure changes in the reference vessel and the container containing the body under test;

a rotation step of calculating an acoustic admittance component of the container containing the body under test by rotating the pressure change ratio calculated in the pressure change ratio calculating step by an angle of $\theta$ so that the pressure change ratio will vary at a slope of 1 with respect to changes in a surface area in a complex plane;

an oblique coordinate transformation step of transforming the acoustic admittance component calculated in the rotation step into an oblique coordinate system whose axes are given by an imaginary axis and a straight line with a slope of 1; and a capacity calculating step of calculating the capacity of the container containing the body under test by multiplying values in a direction of the imaginary axis of the acoustic admittance component transformed into oblique coordinates in the oblique coordinate transformation step by a predetermined real number, wherein the volume of the body under test is found based on the capacity of the container containing the body under test and the known capacity of the container.

4. The acoustic volume measurement method according to claim 3, wherein the angle $\theta$ used in the rotation step and the predetermined real number used in the capacity calculating step are determined before volume measurement using a container whose capacity and surface area are known.

5. An acoustic surface area measurement method for finding a surface area of an object under test based on a ratio of pressure changes produced in a reference vessel and the object under test by giving equal alternating capacity changes to the reference vessel and the object under test, the acoustic surface area measurement method comprising:

a pressure change ratio calculating step of calculating, by a signal processing unit, a ratio between measured values of pressure changes in the reference vessel and the object under test;

a rotation step of calculating, by the signal processing unit, an acoustic admittance component of the object under test by rotating the pressure change ratio calculated in the pressure change ratio calculating step by an angle of $\theta$ so that the pressure change ratio will vary at a slope of 1 with respect to changes in a surface area in a complex plane; and a surface area calculating step of calculating, by the signal processing unit, the surface area of the object under test by multiplying a real part of the acoustic admittance component found in the rotation step by a predetermined real number.

* * * * *